Nov. 8, 1927.
E. O. BROWER
1,648,441
MACHINE ELEMENT
Original Filed Aug. 18, 1920  5 Sheets-Sheet 2
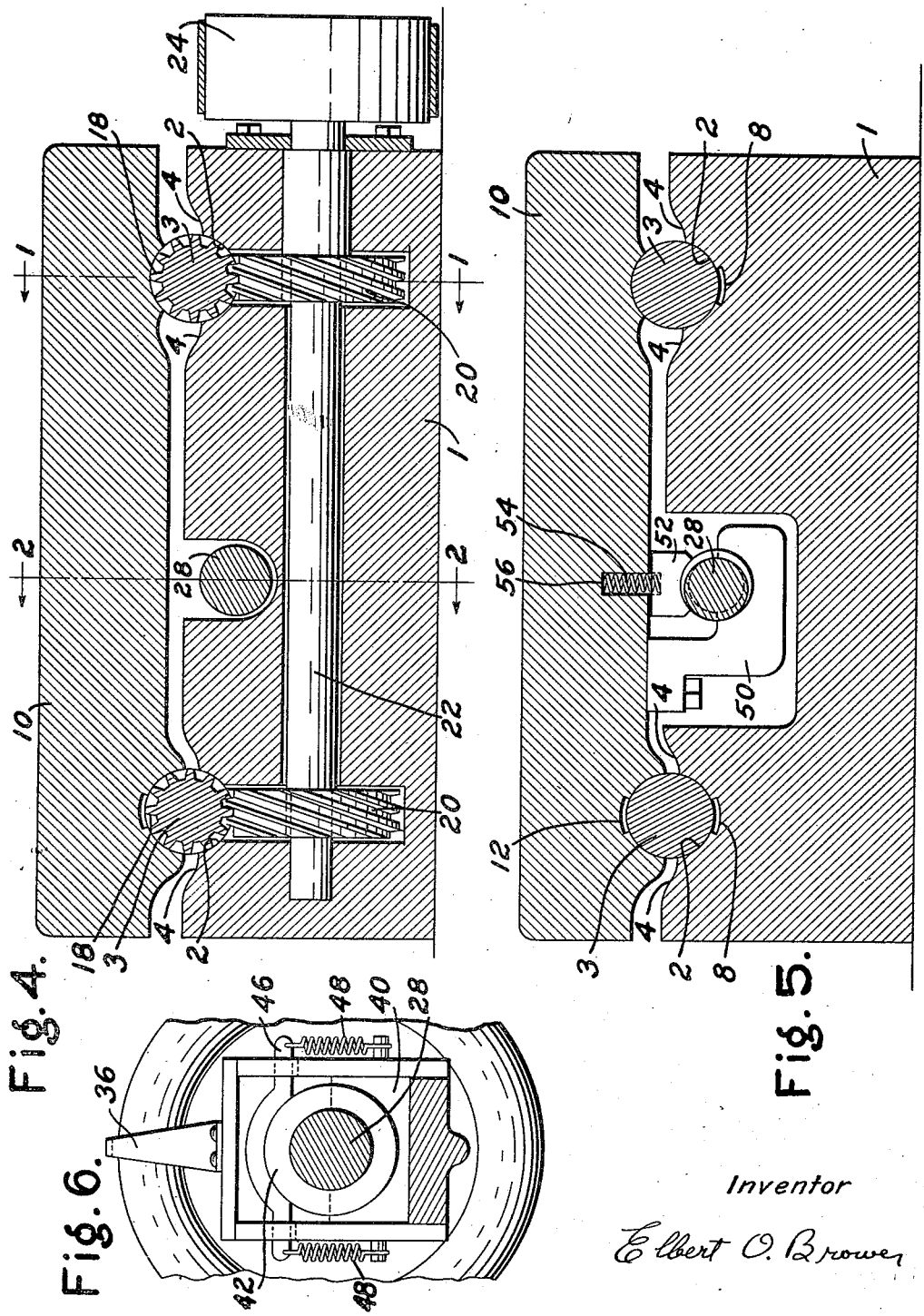
Inventor
Elbert O. Brower Nov. 8, 1927.
E. O. BROWER
1,648,441
MACHINE ELEMENT
Original Filed Aug. 18, 1920    5 Sheets-Sheet 3
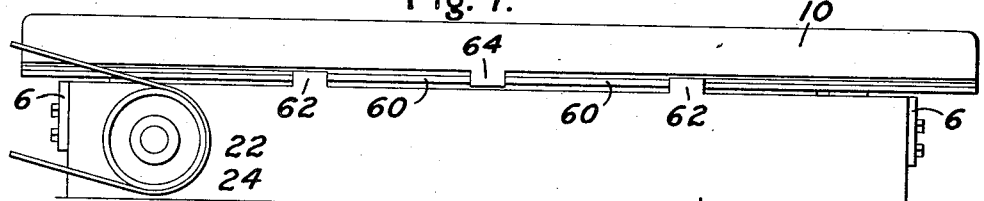
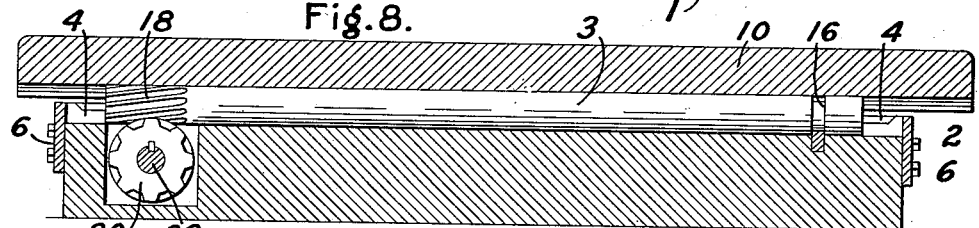
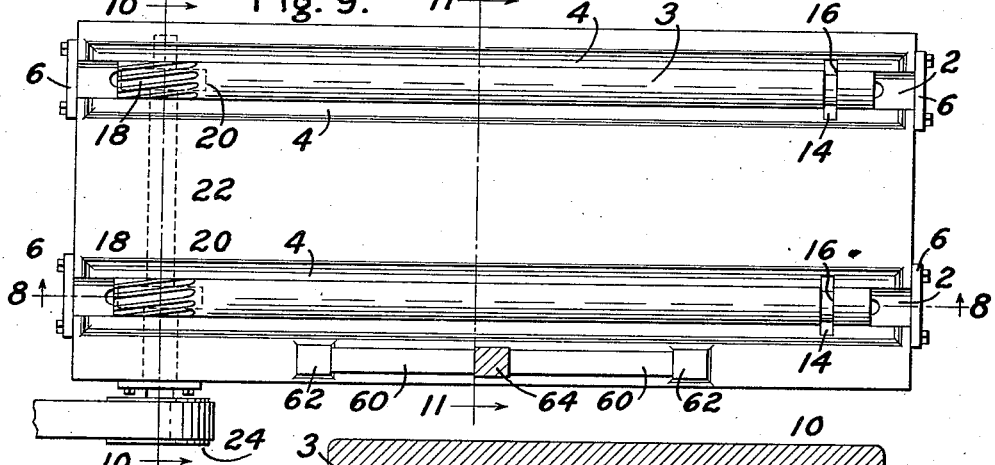
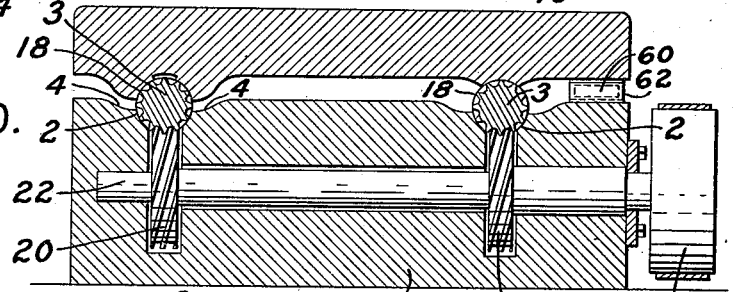
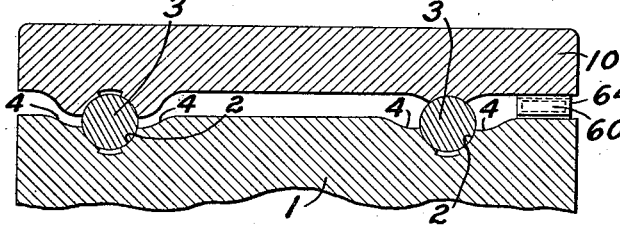
Inventor
Elbert O. Brower Nov. 8, 1927.  
E. O. BROWER  
1,648,441  
MACHINE ELEMENT  
Original Filed Aug. 18, 1920   5 Sheets-Sheet 4

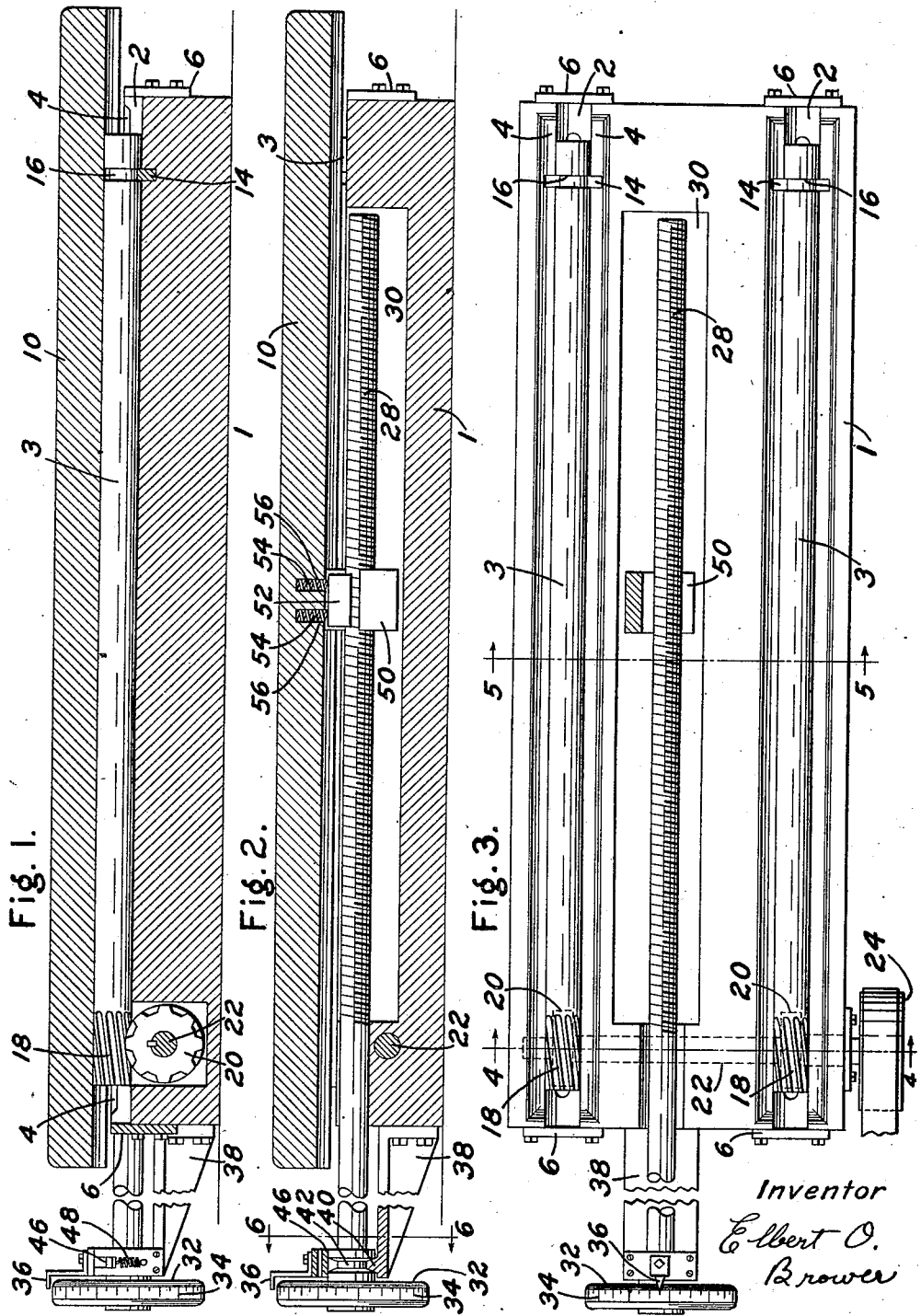

Inventor  
*Elbert O. Brower*

Nov. 8, 1927.

E. O. BROWER 1,648,441

MACHINE ELEMENT

Original Filed Aug. 18, 1920    5 Sheets-Sheet 5

Inventor
Elbert O. Brower

Patented Nov. 8, 1927.

1,648,441

UNITED STATES PATENT OFFICE.

ELBERT O. BROWER, OF HUNTINGTON, NEW YORK.

MACHINE ELEMENT.

Continuation of application Serial No. 404,286, filed August 18, 1920. This application filed December 28, 1922. Serial No. 609,503.

This application is a continuation of application Serial No. 404,286, filed August 18, 1920.

My invention relates to means for facilitating precise control of the relative position and movement of two bodies which are not fastened permanently together, especially in circumstances where the motions are slow or intermittent and the bodies are ponderous and massive.

In a general sense, the movable body is rendered free for its normal motion by relief of friction, while motions in abnormal directions are prevented by supporting surfaces which may be in very close contact over relatively large areas.

An object of the invention is to furnish mechanism for various commercial purposes which will secure a moderate degree of precision with less painstaking labor than is now required of a machine operator. Another object of the invention is to produce mechanism which will function with a high degree of precision, with relatively little exercise of skill and patience by the operator. Another object is to produce mechanism for scientific or other uses which will afford the utmost attainable precision, in the space relations between two bodies, which is compatible with great facility in changing such space relations quantitatively. Still another object is to produce a machine which will indefinitely maintain the desired relationship of its movable parts when these have been set, without danger of displacement by vibration or accidental disturbances. Still another object is to enable the movable or traveling member of a machine to be moved readily thru a very small distance without the hindrance usually resulting from the inertia of starting friction. Still another object is to render the movable member perfectly amenable to control, with respect to position and motion, while it is being moved continuously or intermittently at an extremely slow rate of speed. Still other objects and advantages will be apparent as my disclosure is examined.

To give a preliminary understanding of the invention: It is known that it requires more force to start a traveling carriage or other movable body from rest than it does to maintain the motion after the body has started to slide. This phenomenon is commonly known as "starting friction" or as the "inertia of starting friction", and where precise results are required it frequently produces inaccurate and uncertain response of the movable element to its controlling means, especially in cases where a very slight adjustment or change of position is required. This imperfection of response is probably due to several causes, one of which is no doubt the minute change of configuration of the parts, or strain, due to stresses engendered in overcoming friction between the carriage and its supports. In carrying out my invention I avoid starting friction by interposing a constantly moving part between the movable element and the element on which it is to be supported. When the carriage of an ordinary machine is sliding with a moderate velocity upon its stationary supports, there is no adhesion of rest because the carriage is not at rest; but in my mechanism, whether the carriage is moving or still, there can be no adhesion of rest because the supporting surfaces are not at rest. When the ordinary machine carriage is moving, there is more or less frictional opposition or resistance to that motion; but my invention can be so embodied that this friction of travel is diminished very materially, and in certain circumstances substantially if not absolutely abolished. This diminution of kinetic friction will be illustrated after certain of the embodiments have been examined. Where ample stability is desired in some movable member of an ordinary machine, an attempt to insure such stability by increasing the contact area of the supporting surfaces would aggravate the difficulty of lubricating these surfaces; and both the friction of travel and the adhesion of rest would be increased by the greater area of the lubricant having more or less viscosity; but with my invention the supporting areas may be prodigally increased and still be lubricated efficiently, so that the film of lubricant may be relatively thin, and the bearing surfaces in especially close contact, thus clearly conducing to both stability and precision. By employing the principles which I disclose herein, a ponderous body may be maintained in certain respects as immovable as if it were fixed to its foundations, while at the same time it is rendered as free to move in certain ways as a mass suspended by a long cord is free to swing horizontally; and to employ another figurative illustration—as a drop of rain assumes a symmetrical form in the air, and tends constantly to preserve this perfect symmetry against the vicissitudes of its journey to the earth, somewhat similarly, the carriage of my mechanism is permitted to balance and adjust itself, on account of the constant motion of the supporting surfaces, while any accidental strains and stresses tend to be dissapated and absorbed.

The principle of the invention is illustrated in the accompanying drawings in three forms,—Figures 1 to 6 inclusive illustrating one form, Figures 7 to 11 a second form, and Figures 12 to 18 a third form.

Figure 1 is a longitudinal sectional elevation of mechanism embodying the invention, the section being taken on the line 1—1, Fig. 4;

Fig. 2 is a sectional elevation on the line 2—2, Fig. 4;

Fig. 3 is a top plan view of the parts shown in Figures 1 and 2; but with the movable element or carriage removed for revealing the parts beneath;

Fig. 4 is a cross sectional elevation taken on the line 4—4, Fig. 3;

Fig. 5 is a cross sectional elevation on the line 5—5, Fig. 3;

Fig. 6 is a cross sectional elevation on the line 6—6, Fig. 2.

The foregoing figures illustrate a form in which the motion of the carriage is rectilinear, the normal carriage motion being controlled by a feed screw.

Fig. 7 is a side elevation of a form in which the carriage motion is rectilinear, and in which the carriage is held against travel along its normal path by spacing blocks at one end abutting lugs on the support and at the other end abutting lugs on the carriage.

Fig. 8 is a longitudinal sectional elevation of the form shown in Fig. 7, the section being taken on the line 8—8, Fig. 9;

Fig. 9 is a top plan view of the mechanism of Fig. 7 with the carriage removed;

Fig. 10 is a transverse sectional view on the line 10—10, Fig. 9;

Fig. 11 is a transverse sectional view on the line 11—11, Fig. 9.

The next seven figures illustrate a form of embodiment in which the path of the carriage is circular and of large radius, the carriage being held either by spacing blocks or by adjusting screws; this form being operative when constructed for a path of any specific large radius up to infinity.

Figure 12:
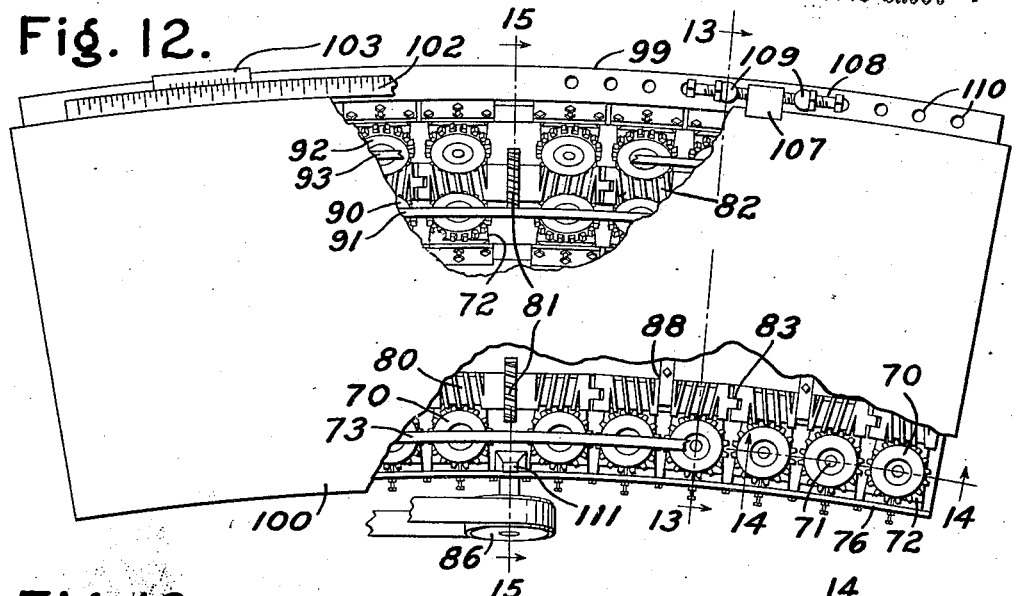

Fig. 12 is a top plan view with parts of the carriage broken away.

Figure 13:
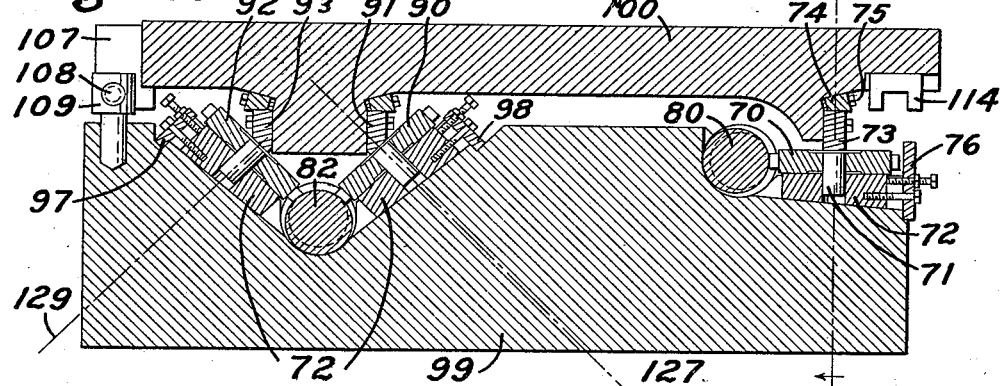

Fig. 13 is a cross section, showing in elevation a few features only, the section being taken on the line 13—13, Fig. 12.

Figure 14:
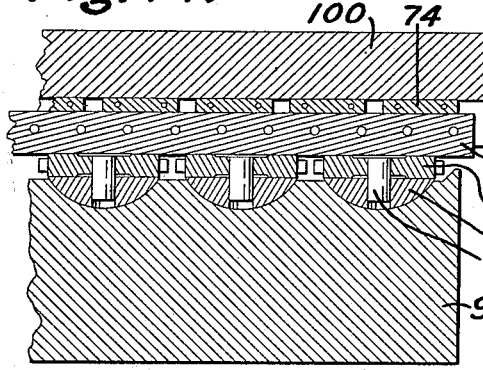

Fig. 14 is a fragmentary longitudinal section on the lines 14—14, Figures 12 and 13.

Figure 15:
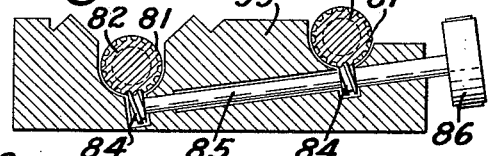

Fig. 15 is a cross section on the line 15—15, Fig. 12, but showing merely certain driving elements.

Figure 16:
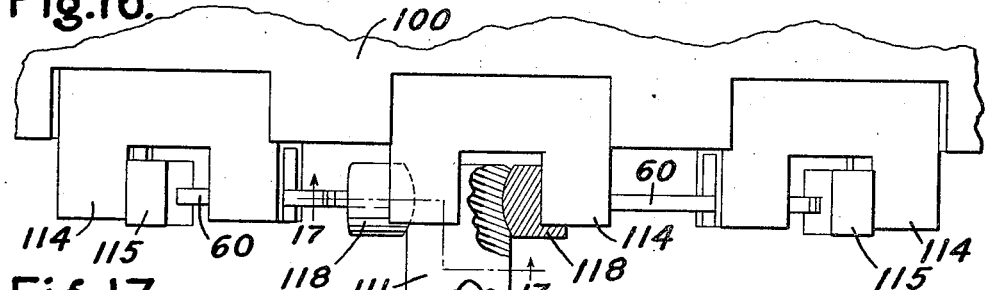

Fig. 16 is a fragmentary side elevation of the carriage showing spacing lugs.

Figure 17:
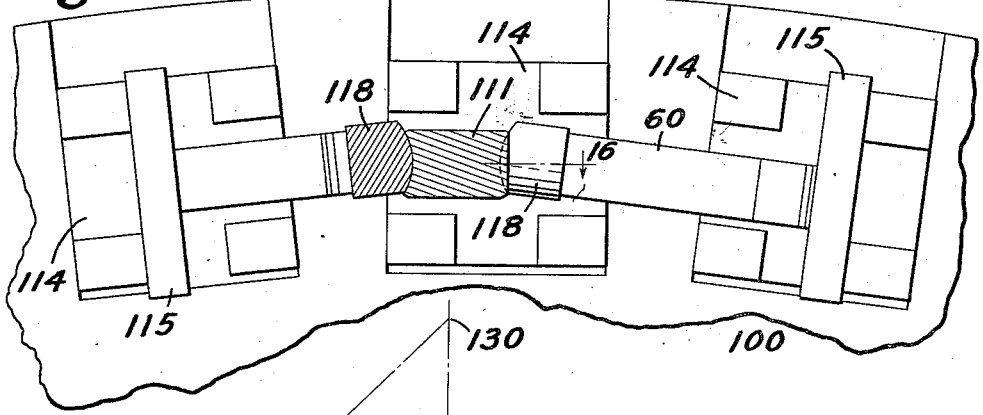

Fig. 17 is a bottom plan view of the parts shown in Fig. 16; the two foregoing figures illustrating a manner of holding with spacing blocks a carriage whose normal path is circular. The curvature of the carriage path is magnified in these two views as it would not otherwise be apparent.

Figure 18:
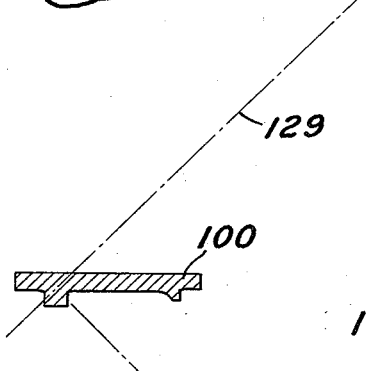

Fig. 18 is a cross sectional diagram of the carriage showing geometrical and numerical relations between the curvature of the carriage path and the curvature of the supporting surfaces.

Figure 19:
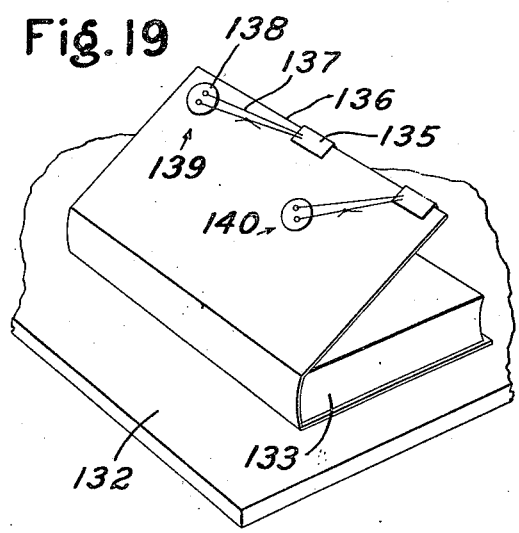

Fig. 19 is a sketch in perspective to illustrate a physical demonstration of a certain principle or law of friction.

Like numerals denote like parts thruout the several views.

Referring first to the form shown in Figures 1 to 6 inclusive:

The element 1 may be regarded as typical of the stationary bed or framework of a machine tool. It has two longitudinal half bearings 2 for supporting the cylindrical, continuously rotating elements 3. For the sake of lubrication it is desirable to form lateral depressions 4 in the bed alongside of the bearings for containing oil for lubricating the elements 3 which for convenience will be referred to as "cylinders". The oil grooves 4 are closed at the ends by dams 6 which are simply plates screwed onto the bed opposite the ends of the grooves. It is desirable that the bottoms of the grooves be cut away at the center, as at 8, Fig. 5, in order that the effects of wear may be somewhat eliminated. Resting upon the cylinders 3 is a carriage. As best shown in Figures 4 and 5 it has cylindrical half bearings on its under side enabling it to rest upon the cylinders 3 and at the same time be guided by them and be prevented from moving in a direction transverse to the cylinders. The bearing at the left, Figures 4 and 5, is grooved at the center as at 12, like the bearings of the base.

Said cylinders 3 are held against longitudinal displacement by feathers or keys 14, best shown in Figures 1 to 3. These are rabbeted into the bed 1 and project up into annular grooves 16 formed in the cylinders. The cylinders are rotated by means of integral gears 18 meshing with and driven by worms 20 rigidly secured to a transverse shaft 22 driven by a pulley 24 or other appropriate means.

While it is not always essential that mechanical means be provided for shifting the carriage longitudinally upon the rotating cylinders, it is nevertheless desirable to do so in certain cases, and in the form shown in Figures 1 to 6 I have illustrated a feed screw 28 whch lies parallel to and between the cylinders and occupies a position in a longitudinal chamber 30 formed in the top of the bed. For rotating this screw, I have shown a hand wheel 32 having a graduated scale 34 on its periphery adapted to cooperate with a pointer 36. This pointer is shown fixed; but it will be understood that the pointer may be movably mounted, and shiftable by hand or otherwise so as to compensate for minute errors in the feed screw; also a vernier may be preferable to a mere pointer in certain cases, but as verniers are known it need not be here illustrated in detail. The screw is prevented from moving longitudinally by a bracket 38 having a lug 40 projecting into the groove of a grooved collar 42 rigidly fastened to the shaft, as best shown at the left end of Fig. 2. In order to keep the collar seated on the lug, I have provided a spring holder illustrated in some detail in Fig. 6. According to this design a saddle 46 rides upon the periphery of the collar and is held down by springs 48. As a result of this construction, not only is the grooved collar held firmly down seated upon the lug, but the device constitutes a take-up for automatically adjusting the parts and keeping them in close bearing in case of wear.

The connecting means between the feed screw and the carriage is best shown in Figures 2 and 5. A stationary half nut 50 is bolted to the under side of the carriage and passes to the under side of the screw where it has internal threads adapted to receive and cooperate with the threads of the screw. In order to assure the firm and continued seating of the screw in the half nut, a pressure member 52 overlies the screw and is constantly urged down upon it by means of helical compression springs 54 seating in sockets 56 formed in the under side of the table.

The rotary movement of the cylinders permits the carriage to move so easily that minute adjustments may be readily and accurately made, for after the handwheel has been turned to a particular position, the motion of the cylinders enables the carriage by itself to make a minute and final adjustment under the reactive forces arising from the resilience of the parts and the minute distortion resulting from the change of the handwheel. The stresses and strains generated by the force necessary to shift the carriage promptly become dissipated, and the parts assume their normal and proper configuration. It will be understood, of course, that the distortion in the ordinary machine tool, occasioned by a shift of the carriage, may not be visible to the eye, but in precision work it may be readily demonstrated that distortion exists. In the form shown in Figures 1 to 6 the carriage is shifted or "fed" by means of the hand wheel 32 and the screw 28 after the fashion of ordinary feed or "lead" screws; but as friction is relieved by the rotating cylinders, the scale readings on the hand wheel 32 may be relied upon to a degree not attained in present machines; and if the screw 28 is rotating continuously for a long time or intermittently, and whether its rate of motion is increasing or decreasing or remains uniform, it will be understood that a precise correspondence between the carriage and its controlling screw will not be disturbed by reason of any extremity of slowness in the rate of carriage travel while the cylinders are in operation.

The form shown in Figures 7 to 11 is similar to the one already described, except that in this case there is no provision for mechanical control of carriage motion. The carriage is shifted from one place to another by hand, and then held against travel by accurately formed blocks or gages 60 which at one end engage lugs 62 rising from the bed, and at the other end engage lug 64 depending from the bottom of the table. It will be understood that blocks of this character are now purchasable, commercial articles, frequently known as "Johansson Blocks" or "Swedish Gages", which are extremely precise. When this type of carriage control is employed, the rotary movement of the cylinders causes the table 10 soon to adjust itself in such a manner as to equalize the stresses on opposite sides of lug 64.

In the type shown in Figures 12 to 18, the normal path of the carriage is circular and friction is relieved by the rotation of a number of individual elements which for convenience will be referred to as disks. The disks are arranged in three rows. In one row are the disks 70 so mounted and adjusted that their upper sides, which are flat, are all at the same height or level to support the carriage by contact with the rail 73. In another row are the disks 90, mounted at an inclination from the horizontal, with their upper sides which are convexly spherical adjusted to support the rail 91. In the third row are the disks 92, mounted at an inclination opposite to that of the second row, with upper sides which are concavely spherical for supporting the rail 93. The curvatures of these disk surfaces are too slight to be apparent in the drawing without an objectionable exaggeration. Taken together, the last two rows of disks form a V as shown in Fig. 13, and as may be noticed in Fig. 12. The purpose of this V is to enable the disks to prevent the carriage from moving transversely to its normal path. The rail 73 is securely bolted to the carriage, and is maintained in proper adjustment by a number of wedges 74 which are retained in place by screws 75. It will be plain that the wedges 74 may have additional screws disposed in opposition to screws 75 if such are desired to facilitate adjustment or for other reasons. The angle of the wedges 74 is exaggerated in order to make it apparent in the drawing; and it will be understood that the rail 72 is machined well enough so that no coarse adjustments need be made by wedges 74. The disks 70 are relieved or cut away slightly so that the rail can have no contact near the center of the disks; and besides this clearance in the disks, the width of the rail 73 is made considerably narrower than the diameter of the disks, as shown in Figures 12 and 13; in consequence, the directions of motion of the disk surfaces are nearly or quite at right angles to the carriage path when they are in contact with the rail. The disks 70 turn about pins 71 which are secured in the blocks 72 which are maintained in proper adjustment upon their inclined seats in the base 99 by adjusting screws in the plate 76 which is fastened to the side of the base. The lower surfaces of the blocks 72 are cylindrical in form, thus enabling the blocks to balance the disks under their loads, and serving other ends which need not be recited. The disks 70 are kept in motion by peripheral teeth which mesh in the screw or worm thread of the segments 80 which are articulated to form a bent shaft which follows the curve of the row of disks 70. As this curve is of relatively large radius, the angle between adjacent segments 80 is a small angle, and hence a faultless universal joint is not needed to allow one segment to drive its neighbor—instead a crude tongue and slot, as indicated at 83, Fig. 12, may be quite tolerable. The segments may be held against longitudinal displacement by straps fitting in annular grooves and serving also to hold the segments down in place, as indicated at 88, Fig. 12. On one of the segments 80 are provided helical teeth 81, Figures 12 and 15, meshing with and driven by a helical gear 84, Fig. 15, on the transverse shaft 85 which is driven by a pulley 86 or other suitable means. On shaft 85 is another gear 84 meshing with and driving teeth 81 on a segment of a second articulated shaft 82 which drives both rows of inclined disks as is apparent in Figures 13 and 12. The inclined disks 90 and 92 are mounted on taper blocks 72 which are held in place by adjusting screws in individual plates 98 and 97 which are bolted to the base 99. The rails 91 and 93 are adjustably secured to the table like the rail 73. These rails can obviously be mounted in sections when warranted by conditions of temperature expansion or other reasons.

In Fig. 12, 102 is a graduated scale fixed to the carriage, and 103 is a vernier mounted on the base and adapted to indicate the position of the carriage while the same is held against travel by lug 107 on the carriage which is gripped between two screws 108 carried in posts 109 which are adapted to be set in any of the holes 110 in the base 99, Figures 12 and 13.

In Fig. 12, 111 is a lug fixed to the base 99 and transversely located so as to pass between the legs of elements 114, Figures 13, 16 and 17, which for convenience will be referred to as benches. Several of these benches 114 are mounted in a row under one side of the carriage, of which three are represented in the side elevation Fig. 16, and the bottom plan view Fig. 17. A simple bar 115 seats properly on the inside of two legs of a bench and bridges the gap between them to make an abutment for one end of the Johansson Blocks or gages 60, which at their other end seat upon the hemisphere 118 whose convex surface fits properly in a concave recess or depression in the lug 111 fixed to the base 99; and a like aggregate of measuring elements is provided and disposed oppositely to the first in order to hold the carriage at a specific position of its path. The elements 118 have a spherical form instead of a cylindrical one in order to permit the hemisphere with its adjacent gages 60 to be grasped and turned between its abutments at any time without disturbing an adjustment of the carriage, for the purpose of insuring a proper contact at the abutting surfaces. It will be understood that the gages 60 are finished, and the working surfaces of the elements 114, 115 and 118 should be finished, so perfectly that they will adhere to each other on simple contact with a cohesion amply sufficient to support their mere weight; but when there may be a suspicion that the measuring elements have become slightly displaced by accident or excessive vibration, it is important to be able to insure a proper contact by the manipulations mentioned. It will be clear that whatever position the carriage may occupy, it will be possible to establish connections between the lug 111 and two of the benches; but some numerical considerations remain to be examined. In order to simplify this phase of the matter, the elements 118 are made precisely half of a sphere, that is with the center of the spherical surface located precisely in or at the plane or flat side of the element. Also it will be assumed that the thickness of any particular bar 115 is precisely one half the width of the slot in which it is used. With this construction, the bench slots need not be all of the same width if each bench has its own bar, and one side of a bar will be precisely in the middle of the bench slot whichever way it is used; in other words the bench and bar afford a concrete basis for making a physical measurement in either direction from an imaginary line and plane through the middle of the bench and the center of rotary motion of the carriage. The lug 111 has the centers of both its concavities located at some definite distance from the center of carriage motion, and this radius should be made some even number of inches, since the gages 60 are made in inches and decimals of an inch. Then in any particular instance, the length of an aggregate of blocks 60 divided by the radius at which the lug 111 is located is numerically the sine of the angle between the bench slot center and the center of the recess in lug 111. If the centers of the two concavities of lug 111 are separated by an even number of degrees of angle, and the benches are spaced at even degrees, it will be clear that the problem of determining the position of the carriage from the particular blocks in use, and the problem of determining what different aggregates of gages need be used to bring the carriage to some other specific position, can be readily handled by the skilled workman who is familiar with the tool commonly known as a "sine bar".

The diagram of Fig. 18 is intended to show certain relations which must obtain in any specific case between the radius of curvature of the path of the carriage, and the radii of curvature of the guiding surfaces. In this figure, line 125 represents the center of motion or axis of rotation of the carriage; line 127 coincides with line 127, Fig. 13, which represents the axis of rotation of the disk 90; and line 129, Figures 18 and 13, represents the axis of rotation of the disk 92, Fig. 13. The line 125 is evidently fixed in relation to the base 99, the radius of the path of the carriage being known; and the lines 127 and 129 are substantially fixed in relation to the base, since the movements of the disks during adjustment may be neglected in this relation. Hence the lines 125 and 127 intersect at some known point 128, Fig. 18, which is the center of curvature of the upper surface of disk 90, Fig. 13. Likewise the upper concave side of disk 92, Fig. 13, has a radius which is numerically the distance from the curved surface of the rail 93, Fig. 13, to the point 130, Fig. 18, where lines 125 and 129 intersect; and the rail 93 has this same radius of curvature, of course, not merely laterally, but also longitudinally. Similarly, the entire curved working surface of rail 91, when it is in perfect adjustment, is a portion of a spherical surface having its center at point 128. The axis of rotation of disk 70 is parallel to line 125, hence these have no finite intersection and the curvature of disk 70 is infinite, that is, the disk is flat. It will be understood that this type of embodiment can be constructed with the center of motion of the carriage (as line 125) at any inclination; but with the axis vertical as herein illustrated, the carriage will not tend to move in its path of its own weight.

For controlling the carriage precisely while it is in motion, there can be provided a worm and worm gear; but these gears are well known and I need not illustrate their application to this embodiment.

Whatever means may be used for controlling the carriage motion or position in this type of embodiment, it will be clear that the disks will function to relieve the frictional inertia of the carriage and permit it to respond readily to its proper control, while accidental displacements of the carriage will tend to a minimum.

In Fig. 19, 132 represents a level surface such as the top of a table, on which is resting a book 133 having its upper cover held at a slight inclination by some convenient object placed inside the book. 135 is a piece of cardboard, bent over so that it can be easily guided by hand along the edge 136 of the cover. A thread 137 is passed through the cardboard to a button 138 or some convenient object to which the thread can be easily secured.

The inclination of the book cover is set so that if the button is pushed down the slope for a way, the button will not continue to slide of itself; or in other words, the book cover is inclined from the horizontal at some angle whose tangent is less than the coefficient of friction of sliding contact. The button is then placed as at 139 and the cardboard is slid along the book edge, dragging the button to a new position 140. If the location 139 is taken not too far from the edge 136, it will be found that the button descends the slope as it is dragged along; though not beyond a certain definite limit which varies if the inclination of the slope is varied.

Now while the button is at rest on the book cover, there is a force tending to slide the button down the slope (this force being the sine of the slope angle multiplied by the weight of the button) but opposed to this force is the friction of contact with the book which prevents the button from sliding down. Hence, in order that the button may slide, either (1) the force must be increased until it can overcome the friction, or (2) the friction must be diminished enough so that it cannot prevail against the force. But it is plain that the tension of the thread cannot increase the force, instead it tends slightly to oppose the force. Therefore the friction has been diminished; or in other words, it is demonstrated that the sliding contact in one direction diminishes frictional opposition to simultaneous motion in transverse directions.

Referring now to Fig. 12, if the rail 73 were wide enough to have contact with a disk 70 over its whole width, that part of the disk which moved in the same direction as the carriage (and at a greater velocity than the carriage) would tend to increase the carriage motion on account of the friction of contact, while that part of the disk which moved in the opposite direction would tend to retard the carriage. Even if these tendencies neutralized each other in theory, they would not be likely to do so perfectly in practice; but by making the rail narrow, as shown in the drawing, these tendencies are evidently very much reduced in quantity; and doubtless the neutralization is more nearly complete with a narrow rail so that the carriage is substantially free from any positive tendency to travel induced by friction with the disks. Hence it is clear that a motion of the supporting surfaces at right angles to the carriage path is the ideal form of support when it is desired not merely to avoid adhesion of rest but also to reduce the friction of carriage travel; such motion at right angles avoiding adhesion of rest because it is continuous motion, and avoiding positive influence on carriage travel as mentioned above, and functioning positively to diminish kinetic friction of the carriage as was shown by the experimental demonstration of Fig. 19.

A very common means of facilitating the control of motion is the ball bearing, and one of its appropriate applications is in the carriage of the typewriter where it permits the carriage to respond properly to the control of the escapement. Neither the weight of the carriage nor the impact of the type bars can deform the bearing balls from the spherical enough to become apparent in the printing of the machine. In contrast to this application, if ball bearings were used for the carriage of a heavy grinding machine, for a carriage which carried a heavy grinding wheel rotating at high speed, the bearing balls might be deformed enough to render impossible that nice precision which a grinding wheel is able to produce when it is mounted and moved with adequate rigidity and stability. Thus my invention may be compared to the ball bearing as a means for facilitating (relatively slow) motion, and contrasted to the ball bearing in regard to stability.

Though I have emphasized the application of my invention to mechanism having bearing surfaces of relatively large area, I do not restrict it to such bearings; for clearly the principle or law of friction exhibited in the experiment of Fig. 19 is valid for "point contact", so called, in a bearing. Also, it will be realized that if an embodiment of my invention were used without any lubricant, the mechanism would still be operative so far as diminution of frictional inertia is concerned.

Having thus described my invention, what I claim as new and desire to secure by Letters Patent, is:

1. A machine tool having a supporting frame, a carriage, and an intermediate element for supporting the carriage upon the frame, said intermediate element being adapted to have an independent movement non-coincident with the direction of travel of the carriage on the frame and sliding with respect to contact between the carriage and the intermediate element.

2. A machine tool having a supporting frame, a carriage, an intermediate element for supporting the carriage upon the frame, and means for continuously moving said intermediate element relatively to the carriage for eliminating adhesion of rest between the carriage and the intermediate element and reducing the kinetic friction.

3. A machine tool having a supporting frame, a carriage, an intermediate cylindrical element for supporting the carriage upon the frame, said intermediate element being arranged parallel with the direction of travel of the carriage, and means for continuously rotating the cylindrical element about its axis for reducing the starting friction and the friction of travel.

4. Mechanism of the class described having a supporting frame, a traveling member, two non-traveling members interposed between the frame and the traveling member, and adapted to support the traveling member and also prevent it from moving transversely, and means for continuously moving said non-traveling members.

5. Mechanism of the class described having a supporting frame, a traveling member, two parallel non-traveling members interposed between the frame and the traveling member and adapted to guide the same and carry the weight thereof, a single power device, and connections between said power device and said non-traveling members whereby the latter are moved continuously and in synchronism with each other.

6. Mechanism of the class described having a supporting frame, a carriage, parallel cylinders embedded partially in the frame and partially in the carriage whereby movement of the carriage transverse to the cylinders is prevented, a feed screw for advancing the carriage lengthwise of the cylinders, and gears for rotating the cylinders for eliminating adhesion of the carriage to the supporting parts and diminishing frictional opposition to an advance of the carriage.

7. Mechanism of the class described having rotatable cylinders, a supporting frame having bearings for said cylinders, a carriage provided with bearings for overlying the cylinders, the supporting frame having depressions arranged alongside of the cylinder bearings for containing lubricant, means for rotating said cylinders, and means for holding the carriage against movement lengthwise of the cylinders.

8. A machine tool having a supporting frame, a carriage, an intermediate element for supporting the carriage upon the frame, said intermediate element being adapted to have an independent movement non-coincident with the direction of travel of the carriage on the frame and sliding with respect to contact between the carriage and the intermediate element, a feed screw, a nut on the carriage for causing it to travel when the feed screw is rotated, and means on the supporting frame for permitting the feed screw to rotate and preventing it from moving longitudinally.

9. A machine tool having a supporting frame, a carriage, an intermediate element for supporting the carriage upon the frame, said intermediate element being adapted to have an independent movement non-coincident with the direction of travel of the carriage on the frame and sliding with respect to contact between the carriage and the intermediate element, a feed screw, a nut on the carriage for causing it to travel when the feed screw is rotated, bevelled interfitting parts, one fastened to the supporting frame and the other to the feed screw and adapted to permit angular and prevent longitudinal movement of the feed screw, and pressure mechanism for holding said interfitting parts in engagement with each other.

10. A machine tool having a supporting frame, a carriage, an intermediate element for supporting the carriage upon the frame, said intermediate element being adapted to have an independent movement non-coincident with the direction of travel of the carriage on the frame and sliding with respect to contact between the carriage and the intermediate element, a feed screw, a half nut mounted on the carriage for engaging the feed screw to cause the carriage to travel when the screw rotates, a pressure member mounted on the carriage and spring-pressed into engagement with the screw to hold the latter in close contact with the half nut, and means for permitting the feed screw to rotate and prevent it from moving longitudinally.

Signed by me this twenty-seventh day of December, 1922.

ELBERT O. BROWER.